United States Patent
Wang

(10) Patent No.: US 9,120,529 B2
(45) Date of Patent: Sep. 1, 2015

(54) CONTROLLING DEVICE FOR SYNCHRONOUS FOLDING PEDALS FOR BICYCLE

(76) Inventor: Dongjun Wang, Shenzhen (CN)

(*) Notice: Subject to any disclaimer, the term of this patent is extended or adjusted under 35 U.S.C. 154(b) by 96 days.

(21) Appl. No.: 13/509,484

(22) PCT Filed: Nov. 12, 2010

(86) PCT No.: PCT/CN2010/078694
§ 371 (c)(1),
(2), (4) Date: Jun. 6, 2012

(87) PCT Pub. No.: WO2011/057581
PCT Pub. Date: May 19, 2011

(65) Prior Publication Data
US 2012/0234132 A1    Sep. 20, 2012

(30) Foreign Application Priority Data

Nov. 13, 2009 (CN) .......................... 2009 1 0110184
May 21, 2010 (CN) .......................... 2010 1 0187865

(51) Int. Cl.
*B62M 3/00* (2006.01)
*B62M 3/08* (2006.01)
*B62K 15/00* (2006.01)

(52) U.S. Cl.
CPC .................. *B62M 3/08* (2013.01); *B62K 15/00* (2013.01); *B62K 15/008* (2013.01); *B62K 2015/003* (2013.01); *Y10T 74/2172* (2015.01)

(58) Field of Classification Search
USPC ...................... 74/512, 560, 564, 594.4, 594.7; 280/294, 297, 298
See application file for complete search history.

(56) References Cited

U.S. PATENT DOCUMENTS 1,196,190 A * 8/1916 Warren ........................ 74/594.7
1,276,139 A * 8/1918 Warren ........................ 74/594.7
(Continued)

FOREIGN PATENT DOCUMENTS

CN     2408039 Y    11/2000
CN     2561696 Y    7/2003
(Continued)

OTHER PUBLICATIONS

International Search Report and Written Opinion from International Application No. PCT/CN2010/078694, mailed Feb. 24, 2011.
(Continued)

*Primary Examiner* — Vicky Johnson

(57) ABSTRACT

A controlling device for synchronous folding pedals for bicycle includes bicycle pedal folding assembly. The assembly includes pedal base configured for pivotal connection with pedal cranks of the bicycle, braking ring and folding transmission subassembly. A foldable pedal is rotatably attached to the pedal base, and the pedal base has the first t axial line, the foldable pedal has the second axial line. The foldable pedal has a working position and a folded position along its rotating track. The braking ring is configured to reciprocate along the first axial line, and the braking ring drives the foldable pedal by the transmission subassembly shifting from the working position to the folded position. When folding pedals, only driving the braking ring can fulfill folding process of the foldable pedal, which operation is simplified and during the course of folding pedals, it is not necessary to touch the foldable pedals by hand.

18 Claims, 19 Drawing Sheets

(56) References Cited

U.S. PATENT DOCUMENTS

| | | | |
|---|---|---|---|
| 2,470,414 A * | 5/1949 | Rippenbein | 74/594.4 |
| 3,303,720 A | 2/1967 | Jaulmes | |
| 7,228,761 B1 * | 6/2007 | Chen | 74/594.7 |
| 8,485,063 B2 * | 7/2013 | Wang | 74/594.2 |
| 2007/0209474 A1 * | 9/2007 | Lin | 74/594.7 |
| 2008/0229876 A1 * | 9/2008 | Hsieh | 74/594.7 |

FOREIGN PATENT DOCUMENTS

| | | |
|---|---|---|
| CN | 2883163 Y | 3/2007 |
| CN | 201151437 Y | 11/2008 |
| CN | 201376647 Y | 1/2010 |
| JP | 2002-46681 A | 2/2002 |
| TW | M 344299 U | 11/2008 |
| WO | WO 2009/092268 A1 | 7/2009 |

OTHER PUBLICATIONS

Extended European Search Report from European Patent Application No. 10829545.2 dated Sep. 5, 2014.

* cited by examiner

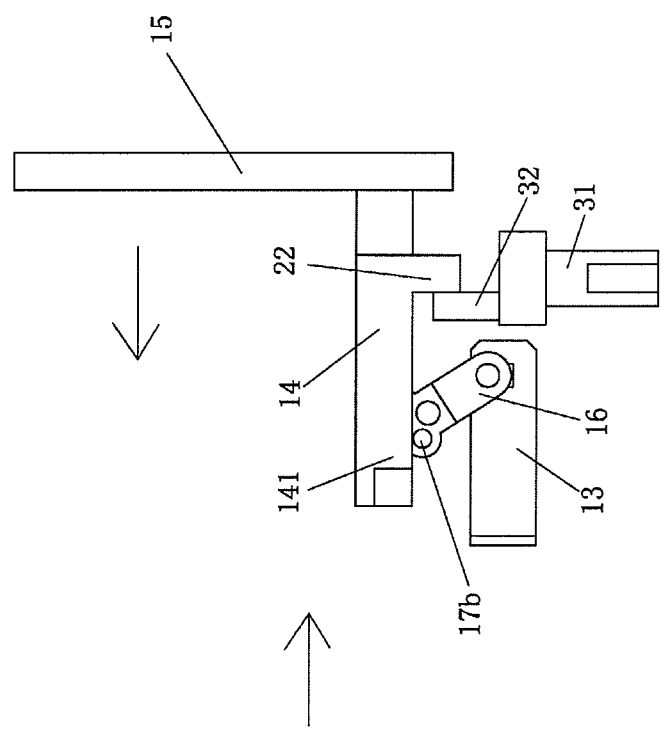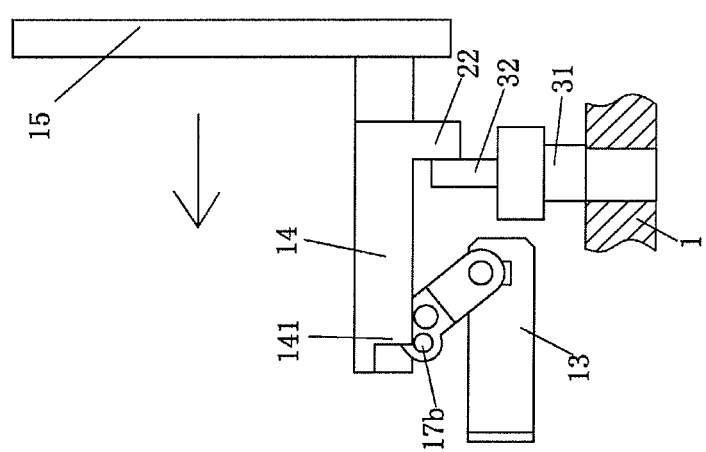
FIG. 3

CONTROLLING DEVICE FOR SYNCHRONOUS FOLDING PEDALS FOR BICYCLE

FIELD OF THE PATENT APPLICATION

The present patent application relates to pedals for bicycle and more particularly to a controlling device for synchronous folding pedals for bicycle.

BACKGROUND

Bicycle is one of the most popular means of transportation. With more and more bulky bicycles used, it will take more and more space to place the bicycle, and wherein, pedals respectively coupled to cranks at two sides of the bicycle bring unnecessary width demand when parking the bicycle. Therefore, various foldable bicycles have been developed and have appeared on the market.

In conventional foldable pedal, folding function is accomplished by folding pedals at two sides of a bicycle, which folding process is operated by hands, and the hands are smudged. In addition, folding pedals is not only smudging hands but also causing inconvenience during folding operation, for the folding pedals is arranged at two sides of the bicycle and in a relative lower position level.

Comparing devices synchronously reducing width of bicycle, a pedal attaching and detaching device disclosed in PCT patent application, No. PCT/CN2008/073824, is too complicated to carry out commercialization.

A typical crank assembly disclosed in Chinese issued Utility patent, No. CN201376647Y, includes a foldable crank, but the foldable crank configuration has intensity problem. Moreover, transmission apparatus drives the foldable crank rotating with very large transmission ratio, and corresponding locking apparatus will bear more acting force, which goes against for bicycle using and folding operation.

SUMMARY

The present patent application is directed to a bicycle pedal folding assembly and a controlling device for synchronous folding pedals and the corresponding bicycle.

In one aspect, a bicycle pedal folding assembly comprises foldable pedal, pedal base rotatingly attached to a bicycle pedal cranks, the foldable pedal pivotally coupled with the pedal base, braking ring and folding transmission subassembly. Wherein the pedal base defines a first axial line, the foldable pedal defines a second axial line, and the foldable pedal has a working position and a folded position along rotating track, the braking ring is configured to reciprocate along the first axial line, the braking ring drives the foldable pedal by the transmission subassembly shifting from a working position to a folded position.

The pedal base and pedal crank are set in a rotating connection by the first axle. The foldable pedal and the pedal base are set in a rotating connection by the second axle. The working position of the foldable pedal may be perpendicular to the pedal crank, in this state bicycle rider can pedal the foldable pedal. The working position of the foldable pedal may be parallel with the pedal crank, in this state bicycle rider has folded the foldable pedal. The braking ring can be configured to be a linear locomotion, thereby driving the foldable pedal rotate relative to the pedal base to fulfill shifting between the working position and the folded position. The braking ring can be in an integrally formed annular shape, or in an annular shape composed of plurality of circular arc segments.

For further clarification, The bicycle pedal folding assembly of claim 1, wherein the foldable pedal comprises two pedal panel, the two pedal panel are both rotatable around the second axial line, the folding transmission subassembly comprises two connecting rods, one end of respective connecting rod is pivotally connected with the braking ring, the other end of respective connecting rod is pivotally connected with corresponding pedal panel, and wherein the two pedal panels rotate in opposite direction. By configuring the two connecting rods rotating in a reverse direction, thereby fulfilling the two pedal panel rotating in a reverse direction.

For further clarification, the pedal base comprises two restricting portions configured to prevent the two pedal panel rotating in reverse, and both the pedal panels comprise restricting inner protrusion in correspondence with the restricting portion. Each of restricting portions can be arranged between the two corresponding restricting inner protrusions.

For further clarification, the folding transmission subassembly is gear-rack mechanism, gear of the gear-rack mechanism is fixed on the foldable pedal, rack of the gear-rack mechanism is driven by the braking ring. The gear can be a gear with partly teeth.

For further clarification, the bicycle pedal folding assembly further comprising a locking subassembly, the locking subassembly comprising a first locking member driven by the braking ring and a second locking member formed on the foldable pedal, in the course of reciprocating of the braking ring, the first locking member defines a locking point relative to the second locking member and a detaching point released from the second locking member. In the initiating state, the first locking member is in a locking position, at this time, the foldable pedal cannot rotate relative to the pedal base. As in detaching process, triggered by locomotion of the braking ring, first detaching locking between the first locking member and the second locking member. Continue to move the braking ring, the foldable pedal rotate relative to the pedal base. By providing limit apparatus so as to fulfilling restriction of the folding position. When spreading out the pedal, move the braking ring in a reverse direction, first the foldable pedal rotate in a reverse direction, and successively the first locking member and the second locking member are locked again.

For further clarification, the first locking member is a locking block fixed on the braking ring, the second locking member is a concave portion defined in the foldable pedal.

For further clarification, the locking subassembly comprises pivoting member, the first locking member is a fixing bar, the second locking member is a slot defined in the foldable pedal, the pivoting member comprises a middle portion, and a first end portion and a second end portion besides the middle portion, the middle portion of the pivoting member is pivotally connected to the pedal base, the first end portion is driven by the braking ring, the second end portion is arranged within the slot of the fixing bar. The braking ring makes the pivoting member rotate, and then causing the fixing bar fulfill a linear reciprocating motion.

For further clarification, the first axial line is perpendicular to the second axial line.

In another aspect, a controlling device for synchronous folding pedals for bicycle, comprises cranks on two sides of a bicycle, bicycle axle; central locking subassembly, two receiving rings. and two bicycle pedal folding assemblies, wherein the two pedal cranks are pivotally connected with respective pedal base of the bicycle pedal folding assemblies, the central locking subassembly is arranged on the bicycle axle, the central locking subassembly synchronously drives the two receiving rings move along the first axial line, the two receiving rings respectively drive the two braking rings of the bicycle pedal folding assemblies move along the first axial line. The central locking subassembly is configured to fulfill synchronous folding of the two foldable pedals, and during the course of folding pedals, it is not necessary to touch the foldable pedals by hand.

The receiving ring drives the braking ring by transmission subassembly, the transmission subassembly comprises a first transmission apparatus configured to change a first direction movement to a second direction movement deviating from the first direction movement, and a second transmission apparatus configured to change the second direction movement to the first direction movement, the first direction refers to direction of the first axial line.

The transmission subassembly comprises transmission bases and locking base, the transmission bases are respectively mounted on upper end portion and lower end portion of the pedal crank.

The first transmission apparatus and the second transmission apparatus are both gear-rack mechanism.

The first transmission apparatus comprises a first transmission rod and a first pivoting member, the second transmission apparatus comprises a second transmission rod and a passive rod, middle portion of the first pivoting member is rotatably connected with the transmission base, middle portion of a second pivoting member is rotatably attached to the locking base, one end portion of the first pivoting member is arranged within a groove of the first transmission rod, and the other end portion of the first pivoting member is arranged within a groove of the second transmission rod; one end portion of the second pivoting member is arranged within a groove at the bottom of the second transmission rod, the other end portion of the second pivoting member is arranged within a groove in the passive rod, the first transmission rod drives the receiving ring, the second transmission rod drives the braking ring.

The second transmission apparatus is connecting rod mechanism.

The second transmission apparatus comprises a first connecting rod and two second connecting rods, one end portion of the first connecting rod is pivotally attached to the locking base, the other end portion of the first connecting rod is pivotally connected with respective end portions of the two second connecting rods, the other end portion of the two second connecting rods are respectively connected with outputs of the braking ring and the first transmission apparatus, the plane defined by the first connecting rod is parallel with the plane defined by the second connecting rod.

The second connecting rod brakes the braking ring by the sliding block, the sliding block defines a groove, the receiving ring is accommodated in the groove.

The central locking subassembly comprises main locking member and locking transmission subassembly, the main locking member drives the two receiving rings by the locking transmission subassembly. The main locking member is configured to receive folding force from related input.

The central locking subassembly is operated by braking force generated during a seat tube being bent. As long as the seat tube being bent, synchronous folding of the foldable pedals will be accomplished.

The controlling device for synchronous folding pedals for bicycle further comprising a seat tube and a third pivoting member, the seat tube comprises a first part and a second part pivotally assembled by a shaft, the third pivoting member is coaxial with the shaft, on end portion of the third pivoting member is fixed on the first part, the other end of the third pivoting member is arranged within a groove of the main locking member, thereby transmitting the braking force from the seat tube to the main locking member.

The locking transmission subassembly is a gear-rack mechanism, the gear of the gear-rack mechanism is rotatably mounted on the bicycle axle, the rack of the gear-rack mechanism drives the receiving ring.

The locking transmission subassembly is a connecting rod mechanism.

The connecting rod mechanism comprises a fourth connecting rod, a fifth connecting rod and a sixth connecting rod, the fourth connecting rod is rotatably attached to the relay controlling base fixed on the bicycle axle, two end portions of the fourth connecting rod are rotatably mounted on respective end portion of the fifth connecting rod and end portion of the sixth connecting rod, the other end portions of the fifth connecting rod and the sixth connecting rod respectively drive The receiving rings, and planes where the fourth connecting rod, the fifth connecting rod and the sixth connecting rod respectively lies are paralleling.

The other end portions of the fifth connecting rod and the sixth connecting rod are both pivotally connected with the pushing piece, the pushing piece defines a groove, the receiving ring is accommodated in the groove.

In yet another aspect, a bicycle comprises controlling device for synchronous folding pedals.

A controlling device for synchronous folding pedals includes pedal cranks on two side of bicycle, a foldable pedal on the pedal crank, independent control device besides the pedal crank, transmission subassembly and central locking subassembly at the bicycle axle for braking independent control devices on both sides. The independent control device includes at least one braking ring, and at least one receiving ring is provided at a receiving point where the central locking subassembly attached to a one-sided independent control device. A transmission apparatus is arranged between the central locking subassembly and a one-sided independent control device.

The independent control device further includes a locking base bearing the independent control device, the transmission subassembly includes transmission base bearing the transmission subassembly, central locking subassembly includes relay controlling base bearing the central locking subassembly.

The braked central locking subassembly is braked by means of bending the seat tube of the bicycle.

A transmission apparatus is provided at where the seat tube of the bicycle is bent near the central locking subassembly.

A controlling subassembly folding pedals for bicycle includes pedal cranks of a bicycle, foldable pedal arranged at distal end of the pedal crank, and bicycle pedal folding assembly arranged besides the pedal crank, wherein the controlling subassembly includes at least one driving subassembly and revolving locking member for folding pedals, the driving subassembly and the revolving locking member are connected by pivotal means.

At least one braking ring is arranged at pivotal joint of the controlling subassembly.

Cooperation subassembly is fixed to the foldable pedal, cooperating with the revolving locking member. Wherein cooperation subassembly is fixed to the foldable pedal, cooperating with the revolving locking member, the cooperation subassembly can adopt gear or pillar.

The driving subassembly pushing the braking ring is in pivotal connection with at least one pivoting member of the locking base, two pillars are provided on the pivoting member, one of the pillars is driven by the locking apparatus or transmission apparatus. The other pillar is configured to drive passive rod connected with the braking ring.

The driving subassembly pushing the braking ring is pivotally attached to a gear of the locking base, the passive driving rack pushing the braking ring meshes with the gear.

Bicycle pedal folding assembly for synchronous folding pedals for bicycle, includes: independent control unit;

pedal crank of the bicycle, foldable pedal arranged at the distal end of the pedal crank, and controlling device for folding pedals besides the pedal crank. Wherein controlling subassembly includes at least a driving subassembly and a revolving locking member for folding pedals, connection of pivotal driving subassembly and the revolving locking member is fulfilled by pivotal connection of a braking ring; and transmission subassembly;

synchronous driving subassembly;

two braking rings at the bicycle axle, synchronous driving subassembly transmit driving force to transmission apparatus besides the bicycle axle by two braking rings.

For further clarification, the assembly further includes apparatus formed on the foldable pedal for cooperating with the locking member.

For further clarification, the independent control device further includes a locking base bearing the independent control device, the transmission subassembly further includes a transmission base bearing the transmission subassembly, and central locking subassembly includes a relay controlling base for bearing the central locking subassembly.

For further clarification, the assembly further includes pivoting member coaxially fixed with the seat tube, spindle core of the pivoting member is coincide with the pivot spindle of foldable parts of the seat tube. A pillar is provided on the pivoting member for accommodating slot of the main locking member, thereby transmitting motion from the seat tube to the main locking member.

A controlling subassembly applying for folding pedals of a bicycle. The controlling subassembly includes pedal cranks besides the bicycle, foldable pedal arranged at distal end of the pedal crank, and a controlling device besides the pedal crank configured to fold pedals. Wherein, the controlling subassembly includes at least a driving subassembly and revolving locking member for folding pedals. Connection between the driving subassembly and the revolving locking member is a rotating connecting means.

For further clarification, the controlling subassembly further includes apparatus formed on foldable pedal for cooperating with the locking member to rotate.

For further clarification, at least one braking ring is provided at pivotal joint of the controlling subassembly.

For further clarification, the independent control device further includes locking base for bearing the independent control device.

For further clarification, the driving subassembly pushing the braking ring is at least one pivoting member in pivotal connection with the locking base. Two pillars are provided on the pivoting member, one pillar is driven by the locking apparatus or the transmission apparatus, the other pillar is configured to drive the passive rod connected with the braking ring. For further clarification, the driving subassembly pushing the braking ring is a gear rotatably attached to the locking base, and the passive driving rack pushing the braking ring meshes with the gear.

The effective result of the present invention is listed as follows: 1) in folding process, driving the braking ring results in folding pedals, which is easy to accomplish operation. During the folding process, it is not necessary to directly contact the pedals; 2) the folding process of the pedal can couple other folding process of the bicycle, thereby it is convenient and fast to fold pedals of folding bicycle.

BRIEF DESCRIPTIONS OF THE DRAWINGS

FIG. 3 is a schematic view showing folding process of foldable pedal according to the first embodiment of the present application.

DETAILED DESCRIPTION

Figure 1:
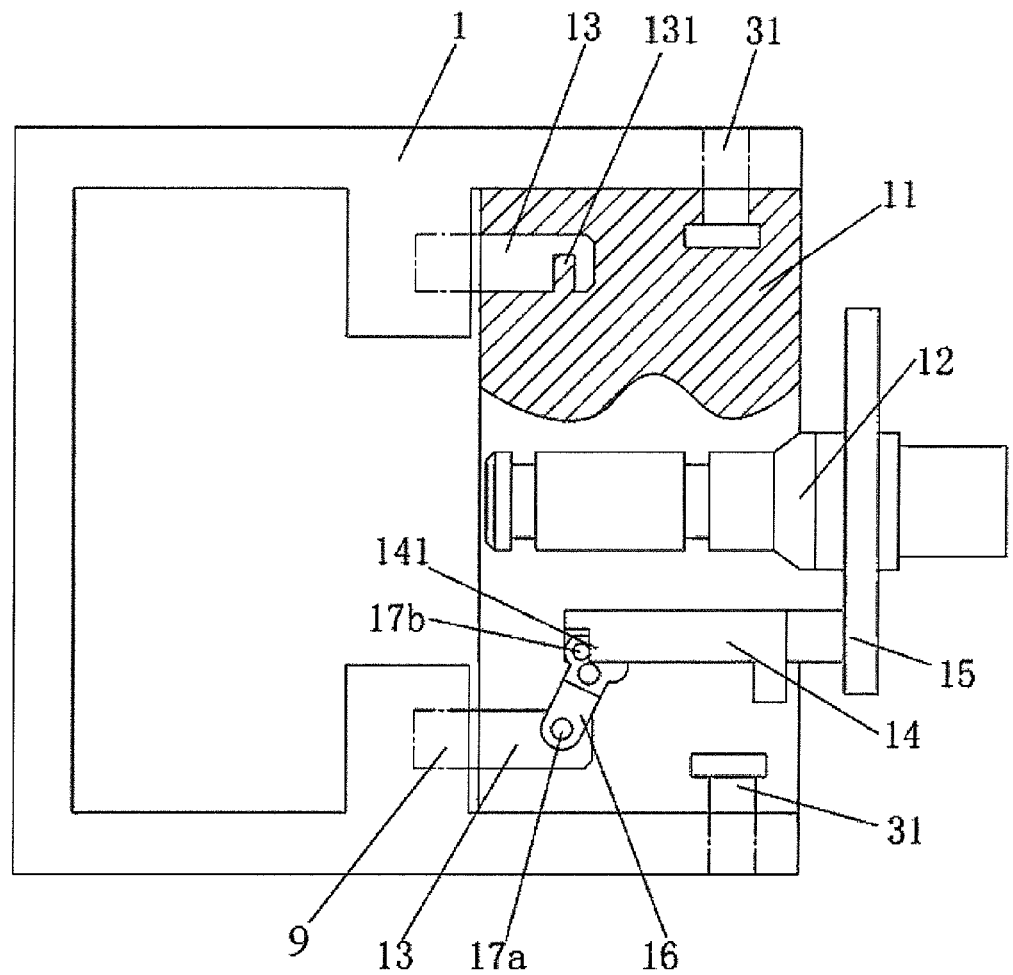
FIG. 1 is a schematic drawing of a bicycle pedal according to a first embodiment of the present patent application.
Figure 2:
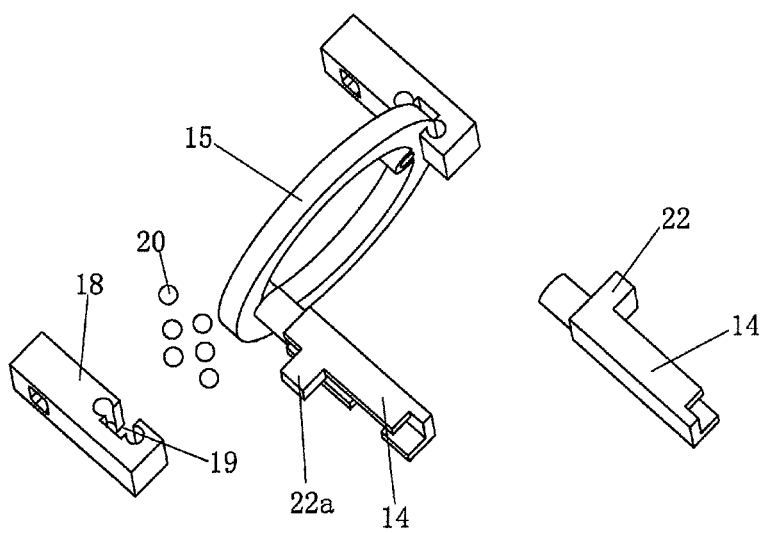
FIG. 2 is an exploded view of locking apparatus according to the first embodiment of the present patent application.

Referring to FIG. 1 to FIG. 7, a pedal folding assembly includes foldable pedal 1 and pedal base 11, end portions of the foldable pedal 1and pedal base 11 are rotatably connected by an articulated shaft 31, the pedal base 11 are rotatably attached to the pedal crank by a central spindle 12 fixed on the pedal crank 2. A fixing bar 13 capable of moving along direction of the central spindle 12 is provided at one side of the pedal base 11. The fixing bar is configured to keep the foldable pedal 1 from rotating relative to the pedal base 11. In addition, the foldable pedal 1 defines slot 9 for receiving the fixing bar 13.

A locating groove is defined in the pedal base 11 configured to receive the locking member 14 reciprocating therein, thereby the locking member 14 and the braking ring 15 mounted on the locking member 14 are guided along direction of the central spindle 12.

A groove slot 131 is defined at the terminal of the fixing bar 13. Two pivoting members 16 are symmetrically deployed according to pedal axial line on the pedal base 11, and pushing members are provided at ends of the pivoting member 16. Wherein, the groove slot 131 in the distal of the fixing bar 13, groove slot 131 is configured to receive one of pushing pillars 17a on the pivoting member. The two pushing members are configured to be pushed by corresponding two pillars on the locking member so as to drive the pivoting member 16 rotate therewith, thereby operating the fixing bar 13 by rotation of the pivoting member 16.

The two locking members 14 are fixed on the same braking ring 15, and pillars are provided on the two locking members so as to cause fixing state between the foldable pedal and the pedal base, wherein the first pillar 141 is used to free the fixing state, and the second pillar 142 is used to keep the fixing state.

In addition, pillars are provided on the locking member 14 configured to cause reciprocating folding process of the foldable pedal. A third pillar 22 on one of the locking member 14 is used to cause folding the foldable pedal, and a fourth pillar 22a of the other locking member is used to cause the foldable pedal reinstate. It is feasible that pillars controlling folding the pedal and reinstate the pedal are both formed on the locking member.

Locomotion of the braking ring 15 is carried out by passive rod 18 of the pedal crank. The passive rod 18 is arranged on a locking base 81 mounted on an end portion of the pedal crank. A groove 19 is defined in the passive rod 18 for receiving braking ring 15. Bearing balls 20 are provided in the groove 19 to reduce friction between the groove 19 and the braking ring 15. The bearing balls 20 are arranged inside the groove 19 and the bear balls 20 and the groove 19 can be molded together.

In detaching process, locomotion of the braking ring 15 drives the locking member 14 fixed on the braking ring, under effect of the locking member 14, the first pillar 141 pushes the pushing pillars 17b of the pivoting member 16, and successively drives the pivoting member 16 rotate, thereby making the pushing pillars 17a on the pivoting member 16 and inside the groove slot 131 of the fixing bar 13 drive the fixing bar 13 get out of the groove 9 of the foldable pedal 1.

The reason why the braking ring 15 is provided is that: the passive rod 18 moves in a predetermined direction relative to the pedal crank. The locking member 14 moves in a predetermined direction relative to the pedal base 11, and the pedal base 11 can rotate relative to the pedal crank 2. Therefore, by providing a braking ring 15, it is realized that no matter any angle is defined between the pedal base 11 and the pedal crank 2, the passive rod 18 can exert equal force to the braking ring 15, defining a rotating connection. Meanwhile, braking ring 15 can be a pushing bearing, exterior of the pushing bearing is fixed with pushing rod, and interior of the pushing bearing is fixed with the locking member.

Referring to FIG. 3, concave bolt of the articulated shaft 31 cooperate with convex bolt formed around aperture of the foldable pedal 1, thereby rotation of the articulated shaft 31 can make the foldable pedal 1 together fixed be folded therewith. In addition, a pushing pin 32 is extended from a side portion of the articulated shaft 31. Location of the pushing pin 32 is determined according to the pillar for controlling folding of the foldable pedal of the locking member 14. When the braking ring 15 free fixation between the foldable pedal 1 and the pedal base 11, (the braking ring 15 makes the pivoting member 16 rotate by the locking member 14, causes the fixing bar 13 get out of groove 9 of the foldable pedal 1, and free the fixation between the foldable pedal 1 and the pedal base 11 to realize relative rotation), make the braking ring 15 reciprocate in the original position, the first pillar 141 of the locking member 14 no longer interferes with the pushing pillars 17b on the pivoting member 16. In this state, the third pillar 22 of the locking member 14 just pushes the pushing pin 32 fixed on the articulated shaft 31, thereby causing the articulated shaft 31 rotate relative to the pedal base 11, and indirectly cause folding of the foldable pedal 1 fixed on the articulated shaft 31. The pivot spindle 31 is perpendicular with the central spindle 12, so as to make the rotating axis along which the foldable pedal 1 rotates around the pedal base 11 is perpendicular and intersecting with the rotating axis along which the pedal base 11 rotating around the pedal crank 2.

Figure 4:
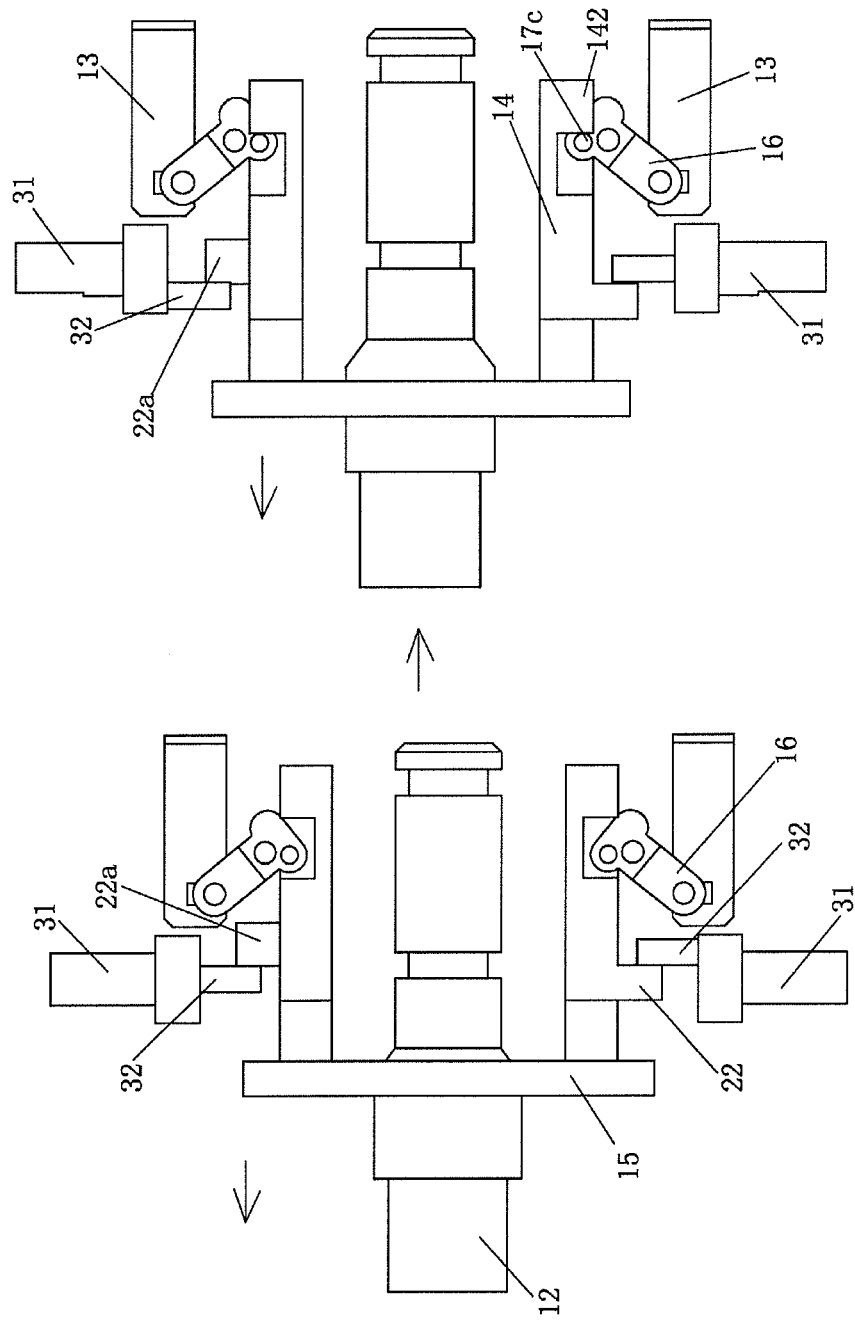
FIG. 4 is a schematic view showing reciprocating folding process of the foldable pedal according to the first embodiment of the present application.

Referring to FIG. 4, when the braking ring 15 drives the locking member 14 reciprocating back to the original state, the fourth pillar 22a of the locking member first drives the pushing pin 32 on the articulated shaft 31, making the foldable pedal 1 to reinstate; when the foldable pedal 1 finishes the reinstating process, the articulated shaft 31 shifts some angle relative to the pedal central spindle 12, and the pushing pin 32 also shifts some angle relative to the fourth pillar 22a of the locking member 14. Continue moving the locking member 14 to the reinstating direction, the fourth pillar 22a on the locking member no longer interferes with the pushing pin 32, and successively the braking ring 15 drives the locking member 14 keep on moving. During this course, pillar 142 on the locking member 14 fixed on the braking ring 15 drives the pushing pin 17c of the pivoting member 16, and successively drives the pivoting member 16 rotate, thereby rotation of the pivoting member 16 brings the fixing bar 13 back to the groove of the foldable pedal 1, finishes fixation between the foldable pedal 1 with the pedal base 11 and finishes reinstating process. In the course of locking and detaching, the two braking blocks respectively bring the two pivoting members 16 rotating therewith. In the folding course, one of the braking block being accompanied with corresponding pushing pin 32 drives the pivot spindle 31 rotate. In the reinstating course, another braking block being accompanied with corresponding pushing pin drives the pivot spindle rotate in a reverse direction.

Figure 5:
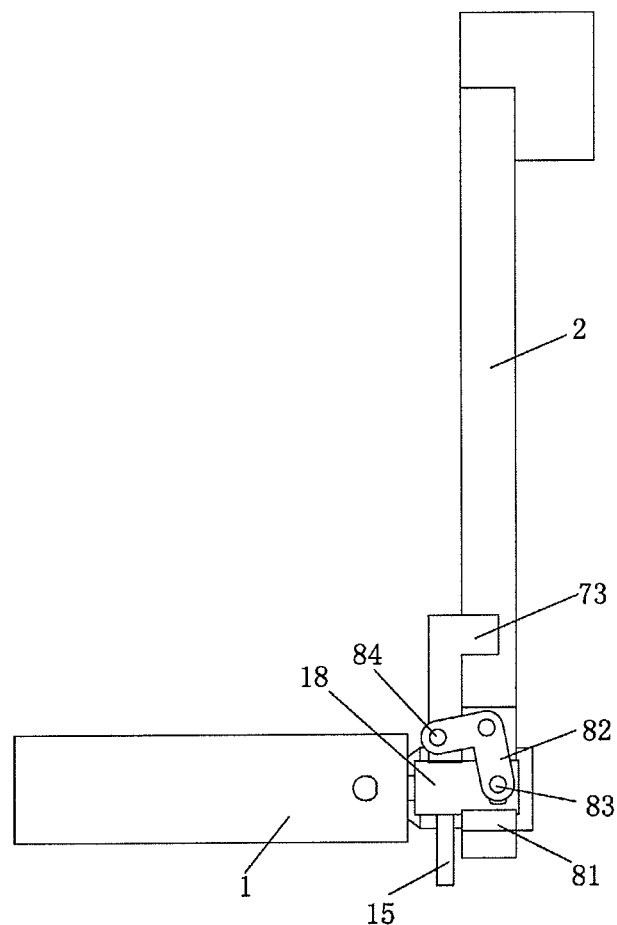
FIG. 5 is a schematic view of independent control device with folding pedal according to the first embodiment of the present application.

Referring to FIG. 5, a locking base 81 is provided between where the pedal crank 2 and the foldable pedal joint, the locking base 81 is pivotally engaged with a pivoting member 82 for transmission purpose, the pushing rod 83 of the pivoting member 82 is arranged in a groove of the passive rod 18 of the independent control device. Another pushing rod 84 is arranged in a groove of the transmission rod 73. Meanwhile, the locking base 81 is equipped with a locating part configured to limit locomotion of the passive rod 18 and the transmission rod. By simultaneous moving transmission rods 73 on two sides of the pedal crank 2, pushing the pushing rod 84 to drive the pivoting member 82 rotate, then the passive rod 18 is moved by the pushing rod 83, and the passive rod 18 pushing braking ring 15, thereby folding and reinstating the foldable pedal 1 no longer be finished by hand.

Figure 6:
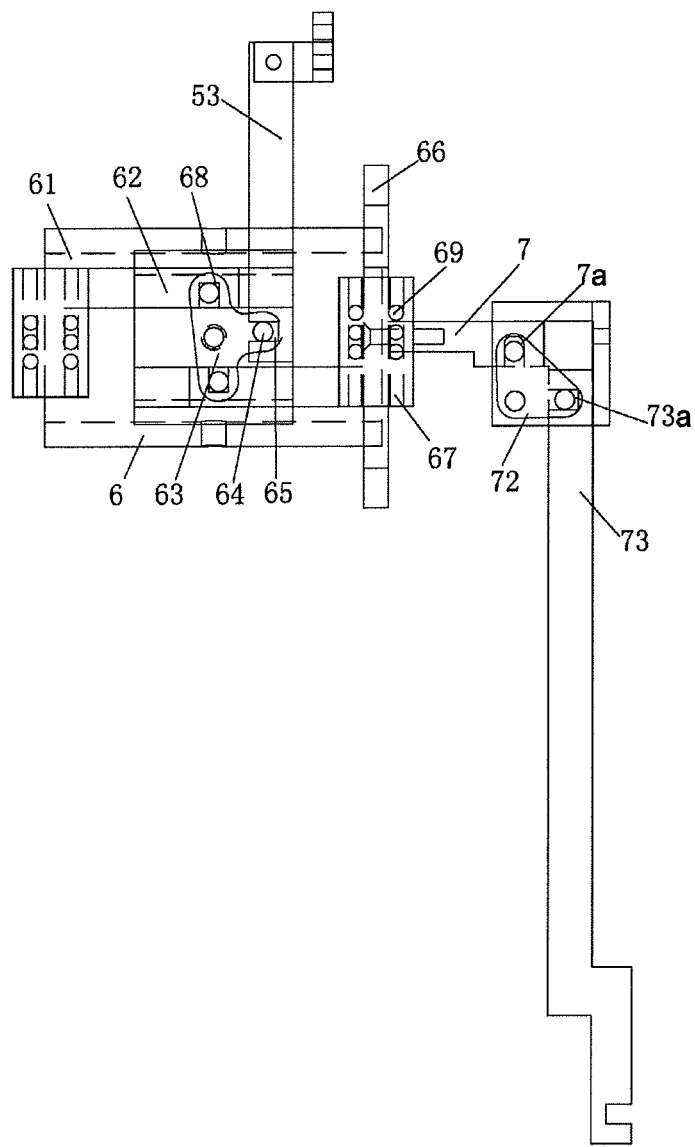
FIG. 6 is a schematic view of central locking subassembly according to the first embodiment of the present application.
Figure 7:
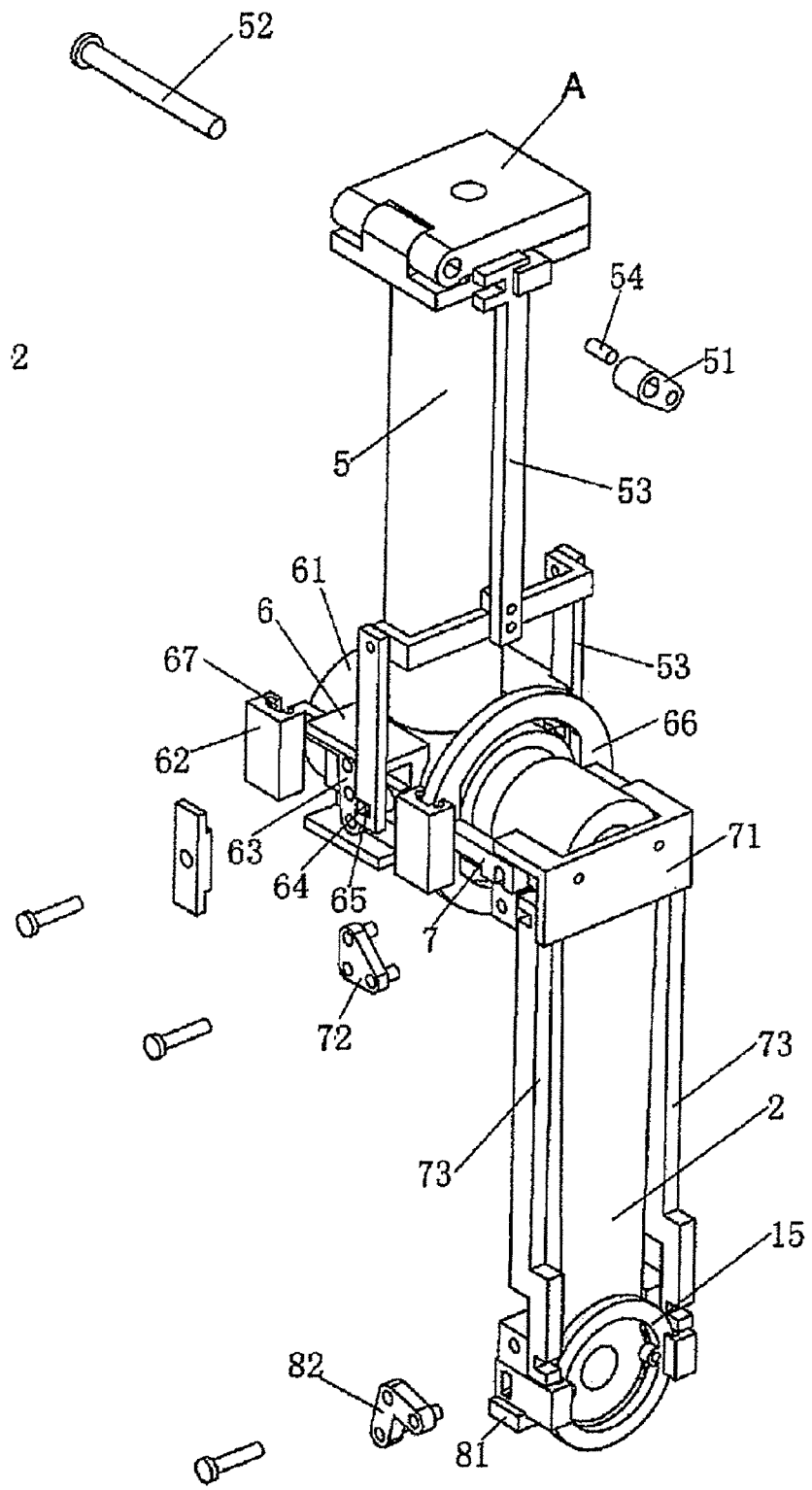
FIG. 7 is a perspective view of central controlling assembly according to the first embodiment of the present application.

Referring to FIG. 6 and FIG. 7, seat tube 5 of the bicycle is divided into two portions pivotally engaged. The pivoting member 51 for braking purpose is fixed on an A portion relative to the seat tube, at the same time, spindle core of the pivoting member 51 is in superposition with the pivot spindle 52 between the two portion of the seat tube. A pushing rod 54 is formed on the pivoting member 51 to cooperate with a groove defined in the main locking member 53. A relay controlling base 6 is mounted on the bicycle axle 61. A structure is provided on the relay controlling base 6 configured to make the main locking member 53 and locking member 62 move in a predetermined route. A pivoting member 63 is pivotally attached to the relay controlling base 6. Wherein, a pushing rod 64 on the pivoting member is arranged in another groove 65 of the locking member 53. Another two pushing rods are arranged in slot 68 of the locking member 62. Terminal of the locking member 62 defines a groove 67 for accommodating the receiving ring 66, and, bearing balls 69 for reducing friction with the receiving ring are provided. A transmission rod 7 is formed on the receiving ring 66. A transmission base 71 is mounted at the end portion of pedal crank near the bicycle axle, and a pivoting member 72 for transmission is rotatably attached to the transmission base 71, and two pushing rods on the pivoting member 72 are respectively located in grooves 7a, 73a of the transmission rod 7 and the transmission rod 73. A restricting mechanism is provided on the transmission base 71 configured to limit locomotion of transmission rod 7 and transmission rod 73, thereby limiting locomotion of the receiving ring 66 fixed on the transmission rod 7 along the direction of axial line of the bicycle axle 61. For the pedal crank 2 rotates relative to the bicycle axle, configuration of the receiving ring is to make the central locking subassembly have an angle-equal receiving of the transmission subassembly and braking on the independent control device. Under the same principle, the receiving ring can be configured to be a bearing, wherein exterior ring of the bearing is connected with the locking member, interior ring is connected with the transmission rod, and the transmission subassembly can be gear transmission or belt transmission.

By bending the seat tube, causing the pivoting member 51 fixed on the seat tube A rotate, successively making the main locking member 53 displace, displacement of the main locking member 53 causing the locking member 62 on the bicycle axle push the receiving ring 66 moving along direction of the central spindle of the bicycle axle, and displacement of the receiving ring 66 making the transmission rod 7 move, successively causing the transmission base 71 at the end of the pedal crank rotate, thereby driving the transmission rod 73, making the pivoting member 82 on the braking base 81 at the pedal crank, and causing the braking ring 15 of the independent control device shifting along direction the central spindle of the pedal, in the end controlling the two foldable pedals on two sides of the bicycle synchronously folded.

To sum up, by bending the seat tube, transmitting the braking process to the foldable pedal at distal end of the pedal crank, thereby foldable pedals on two sides of the bicycle can couple bending course of the seat tube, automatically self-folded.

in present embodiment, when folding the foldable pedal, first, detaching fixation between the pedal base and the foldable pedal, then making the foldable pedal rotate in positive direction relative to the pedal base; during the reinstating course, first making the pedal base rotate in a negative direction relative to the pedal base, than accomplishing locking of pedal base to the foldable pedal.

Embodiment 2

Referring to FIG. 8 to FIG. 11, in present embodiment, the pedal panel 11b with the first concave portions 21b at two end thereof is connected with the connecting block 22b by screw to form an integral foldable pedal, it is for easy assemble purpose adopting the kind of connection. One of the pedal panels is fixed with a gear 24b with partly gear teeth by rivet 23b. The other pedal panel form a pillar 25b configured to assist the foldable pedal folding during reinstating process. Two locking blocks 26b are provided on the braking ring 15b, and one end portion of the locking block can cooperate with the first concave portion 21b on the pedal panel 11b. The other end portion cooperates with the second concave portion 27b of the pedal base 3b, and the two locking blocks are respectively provided with a rack 28b and a locking block 29b. A limit protrusion 33b is formed at brim of the pedal base 3b configured to limit locomotion of the rack 28b and the locking block 29b. Wherein, the rack 28b cooperates with the gear 24b fixed on the pedal panel, so as to rotate the pedal panel 11b, and the locking block 29b cooperates with a pillar 25b on the other pedal panel, so as to assist the foldable pedal during the reinstate process.

In the state that the foldable pedal is unfolded, the two shafts 4b respectively penetrate through the pedal panels 11b and get inside the pedal base 3b, so as to form a fixing fulcrum. Distal end of the locking block 26b of the braking ring 15b is arranged inside the first concave portion 21b in the end portion of the pedal panel, and the other end of the locking block is placed in the second concave portion 27b of the pedal base, thereby the locking block 26b forming a second fixing fulcrum between the pedal base and the pedal panel, at this moment, the pedal panel is locked relative to the pedal base.

Figure 9:
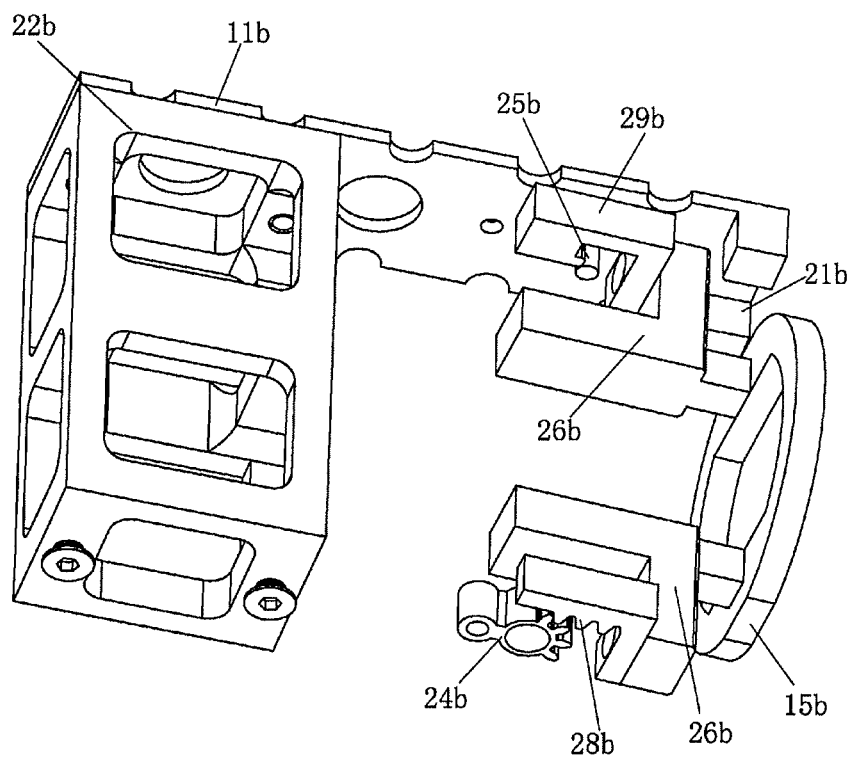
FIG. 9 is a perspective view showing folding process according to the second embodiment of the present application.

Referring to FIG. 9, for better understanding of the folding process of the foldable pedal, the pedal base and one of the pedal panel are hidden on the figure. When the braking ring 15b is braked and moves to the detaching direction, first end portion of the locking block 26b gets out of the first concave portion 21b in the pedal panel. In this moment, the foldable pedal and the pedal base form a pivoting fulcrum only relying on the shaft 4b. When continuing braking the braking ring 15b in the detaching direction, a rack 28b fixed on one of the locking block of the braking ring meshes with the gear 24b fixed on the pedal panel. The process initiating folding the foldable pedal is the process to fold the foldable pedal. When the braking ring moves to a predetermined position, the foldable pedal revolves about 90 degrees relative to the pedal base, by now the folding process of the foldable pedal is accomplished. Reinstating the aforementioned operation, just reverse the braking direction of the braking ring. During the course of reinstating, when the rack indirectly attached to the braking ring is about to finish or already finish meshing with the gear, the foldable pedal will have some excursion relative to the pedal base. At this moment, the locking block 29b fixed on the locking block 26b capping the pillar 25b on the foldable pedal, causing the foldable pedal revolve until paralleling with the pedal base, at this moment, continuing moving the braking ring in the reinstating direction, the locking block 26b can move into the first concave portion 21b of the foldable pedal, thereby achieving reinstating folding purpose.

Figure 8:
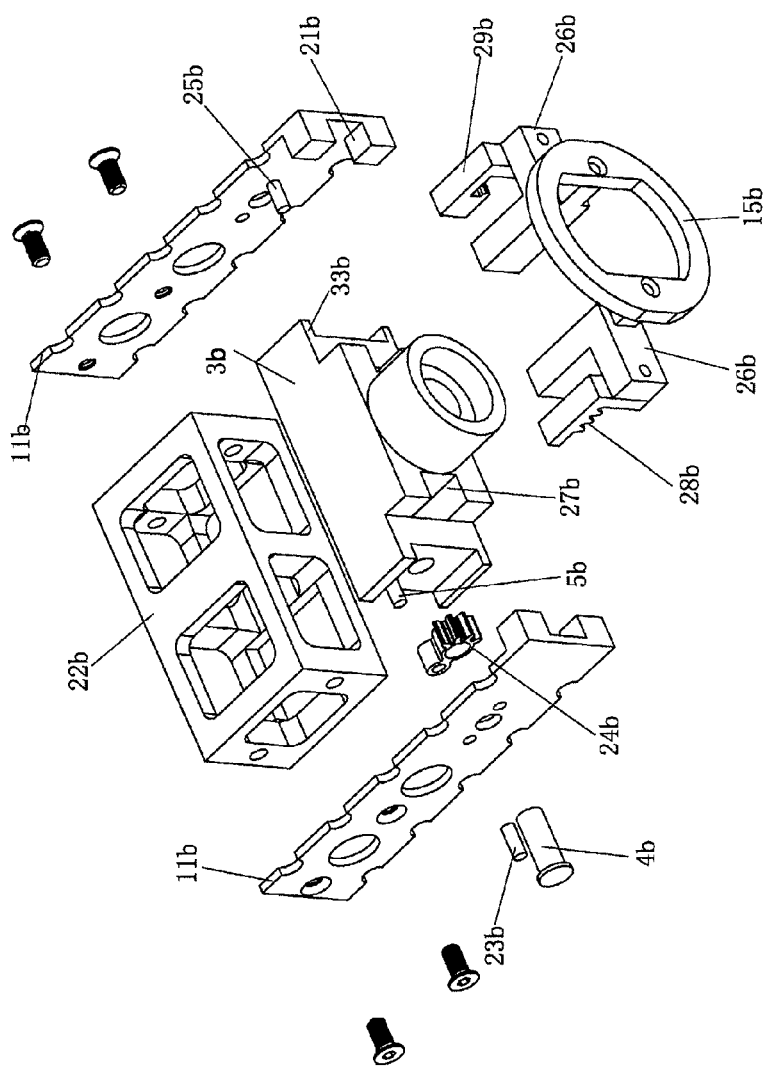
FIG. 8 is an exploded view according to a second embodiment of the present application.

Referring to FIG. 8, a pillar 5b is provided on the pedal base 3b facing the gear 24b, the pillar is configured to insure that the pedal panel 11b can only be folded in one direction relative to the pedal base 3b, i.e., preventing non-cooperation between the locking block 26b and the first concave portion of the pedal panel due to excessively revolving of the pedal panel when the rack 28b on the locking block finishes meshing with the gear 24b of pedal panel, during the reinstating folding process.

Therefore, by braking of the braking ring, it is feasible to realize folding and detaching process. Reinstate braking the braking ring, it is feasible to reinstate the braking process.

Figure 10:
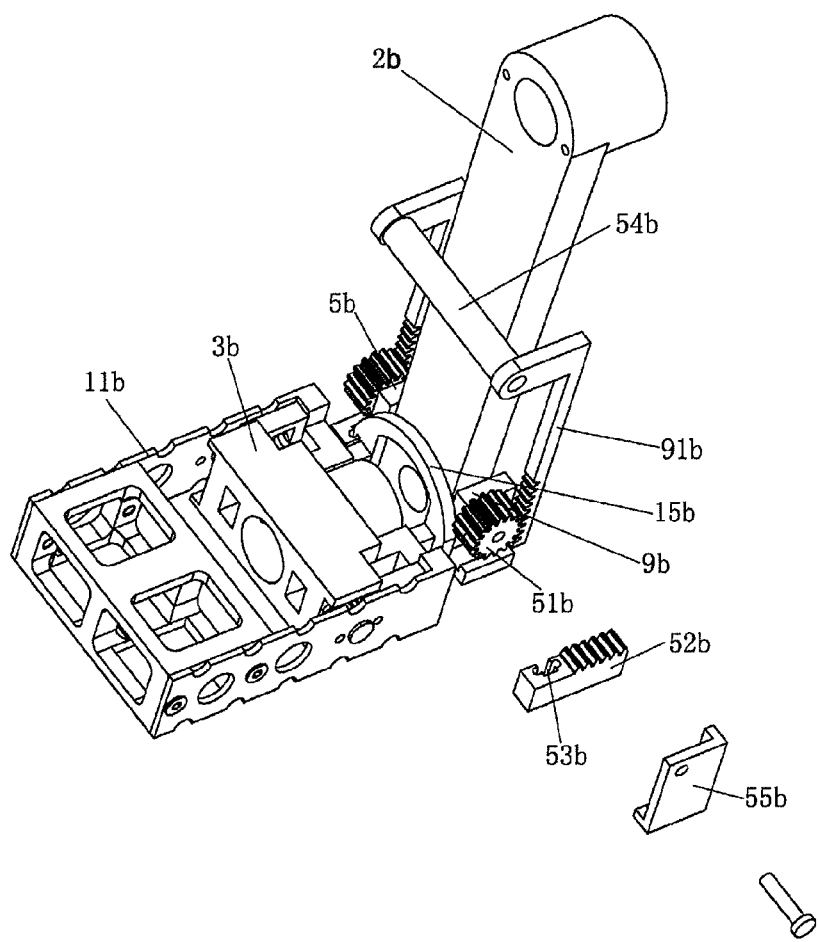
FIG. 10 is a perspective view including controlling subassembly according to the second embodiment of the present application.

Referring to FIG. 10, locking base 9b are fixed on end portion of the pedal crank 2b, gear 51b is pivotally attached to the locking base, at the same time, the gear 51b simultaneously meshes with the passive driving rack 52b and the locking rack 91b. Wherein, one end portion of the passive driving rack defines a groove 53b for accommodating the braking ring 15b. Bearing balls are provided inside the groove. The locking racks 91b at two sides of the pedal crank are joined by an attaching strip 54b, thereby forming a uniform main locking member. At the moment, the locking base 9b and the coordinating piece 55b defines a slide way for limit locomotion of the locking rack and the passive driving rack. By pulling the attaching strip 54b bringing two locking racks, makes output driving force brake the passive driving rack 52b by the gear 51b, successively the braking ring 15b connected with one portion of the passive driving rack 52b drives the pedal locked and detached.

In addition, the braking ring can be assembled by two independent semi-rings, keep the criterion that no matter any angle the two independent semi-rings revolving, the groove defined in an end portion of the passive driving rack can be connected with the passive driving rack.

Figure 11:
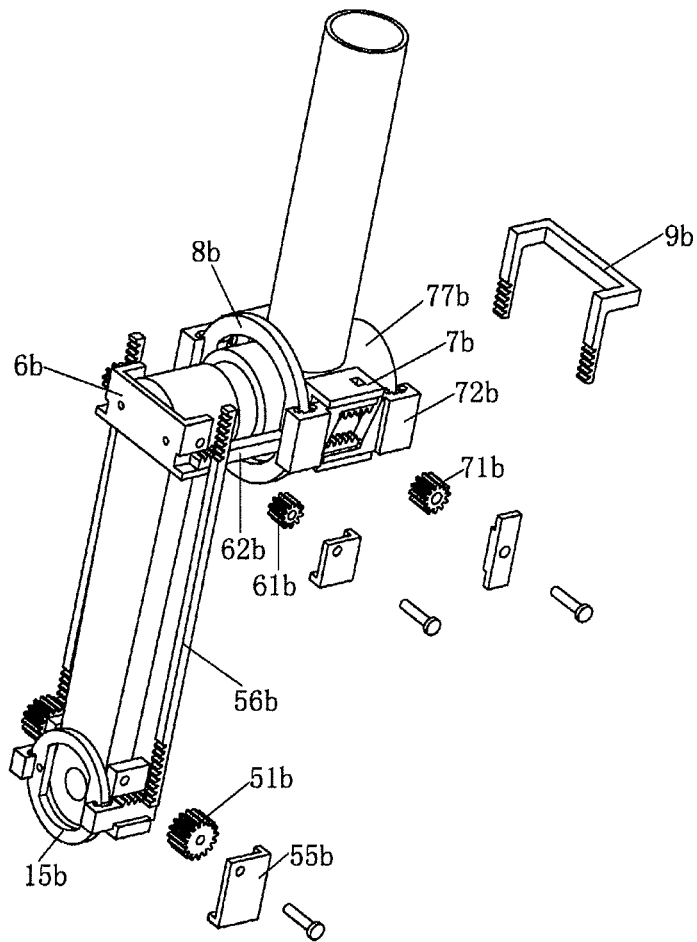
FIG. 11 is a partly exploded view according to the second embodiment of the present application.

Referring to FIG. 11, the end portion of the pedal crank at the braking ring is the same with that shown in FIG. 10, the driving means alters to be a bicycle axle driving. Locking racks on two sides of the pedal crank shown in FIG. 10 serve as lower course transmission racks in FIG. 11. A transmission base 6b is provided at an end portion of the pedal crank where joining the bicycle axle. A driving gear 61b is rotatably attached to the transmission base. Driving gears at the moment mesh with lower course transmission rack 56b and upper course transmission rack 62b. Transmission racks on both sides of the upper course are fixed on a receiving ring 8b. A relay controlling base 7b is fixed around the exterior of the bicycle axle 77b. A relaying gear 71b is pivotally connected to one side of the relay control base. The gear simultaneously meshes with two driving racks 72b and meshes with a locking rack 9b. Wherein, a groove is defined in the end portion of the driving rack 72b for accommodating the receiving ring 8b. Bearing balls reducing friction force are provided inside the groove. By pulling the locking rack 9b, making the relaying gear 71b drive the two driving racks 72b meshed therewith, causing the two driving racks extend in a reverse direction, and driving the receiving ring 8b, making the driving gear drive the lower course transmission rack 56b by the upper course transmission rack 62b fixed with the receiving ring, so as to drive the passive driving rack, making the braking ring 15b pivotally engaged with the passive driving rack reciprocate, thereby the braking ring drives folding of the foldable pedal.

In addition, receiving ring 8b can be fixed with the driving rack. The transmission rack meshes with the driving gear is not fixed with the receiving ring, instead, defining a groove the same as groove defined in the end portion of the driving rack for accommodating the receiving ring. Bearing balls for reducing friction force with the receiving ring are provided inside the groove, so that, relay controlling of the present invention can be carried on to the transmission subassembly.

In addition, bending means of the seat tube can also adopt gear-rack mechanism. Wherein, the gear is fixed on one of the seat tub parts pivotally engaged each other, and the rack is fixed with the locking rack 9b.

In another embodiment, a cam is fixed on one of the seat tub parts pivotally engaged each other, or rotatably engaged with a connecting rod, utilizing transmission parts, convey output force from the seat tube being bent to the receiving rings at the bicycle axle, and driving the two braking rings of the lower course. Braking means of the seat tube is out of restrictions from the embodiments.

in present embodiment, utilizing gear-rack mechanism the central controlling assembly drives the two receiving rings, making the two receiving rings apart from each other or close to each other along the axial direction of the bicycle axle, and the two receiving rings are respectively drive the two braking rings by the two gear-rack mechanisms reciprocate along the axial direction of the pedal base 3b.

Embodiment 3

Figure 12:
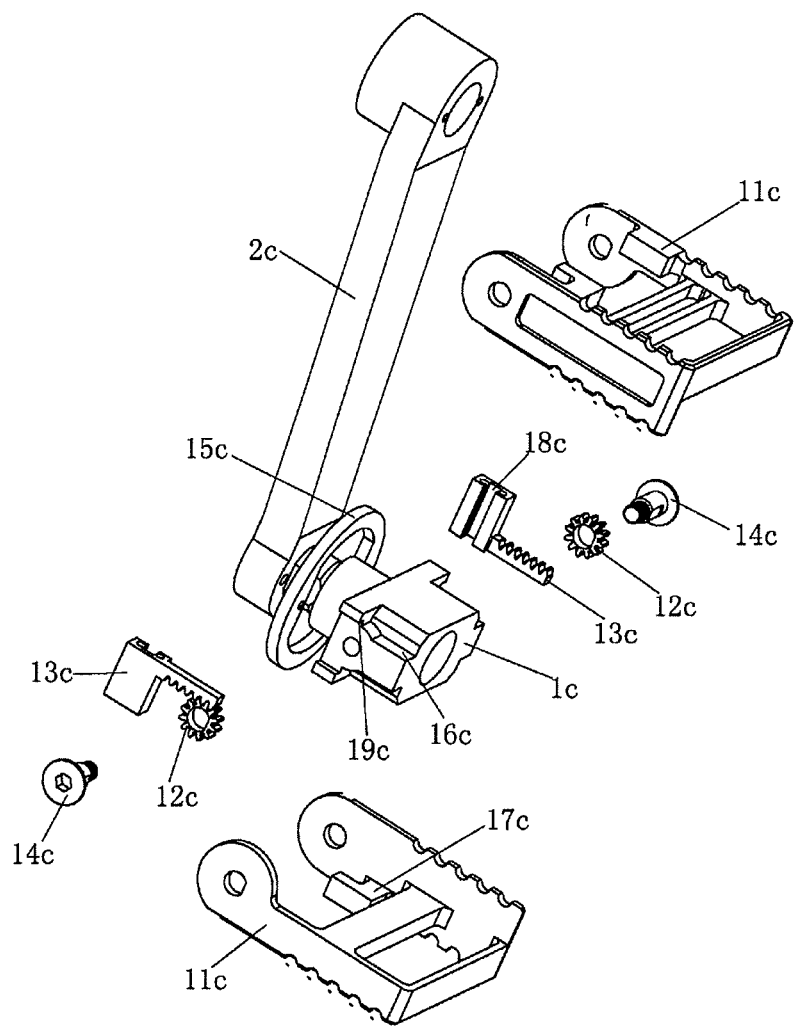
FIG. 12 is an exploded view according to a third embodiment of the present application.
Figure 13:
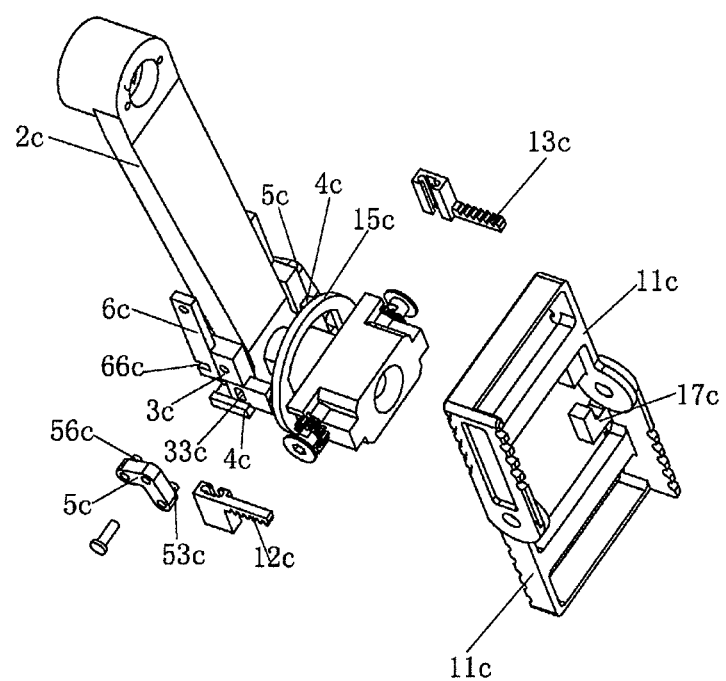
FIG. 13 is an exploded view including controlling subassembly according to the third embodiment of the present application.

Referring to FIG. 12 and FIG. 13, the pedal base 1c is connected with the pedal crank 2c by a central spindle fixed on the pedal crank 2c. Two pedal panels 11c are provided on two sides of the pedal base pivotally engaged thereon. Restricting mechanism 16c, 17c, are provided respectively mounted on the pedal base and the pedal panel, so as to keep the pedal panel only rotate in one-sided direction relative to the pedal base, and the two pedal panels rotate in a reverse direction. At the moment, each independent pedal panel attains a misplacing engagement by self-dislocation of the pivoting aperture, notch of the articulated shaft 14c, nicks of gears 12c, so as to fix the gear on one side thereof with the corresponding pedal panel. Locking racks 13c are provided configured to mesh with gear on both sides of the pedal base. A groove 18c is defined in one end portion of the locking rack 13c for accommodating the braking ring 15c. Bearing balls reducing friction force are provided inside the groove.

Wherein, slide way 19c for receiving the locking rack is defined at the brim of the pedal base. When the braking ring 15c is free of brake, i.e., restricted at some predetermined place, one-sided pedal panel of pedal base 1c is relatively fixed thereon under application of the pivoting point of the pedal base and the restricting mechanism on the pedal panel. At the moment the braking ring 15c is free of operation, the locking rack 13c connected with the braking ring limits rotation of the foldable pedal 11c, thereby the foldable pedal 11c is fixed relative to the pedal base 1c.

Referring to FIG. 13, a locking base 3c is mounted on an end portion where central spindles of the pedal crank 2c and the pedal base 1c are joined. Two passive rods 4c are provided capable of limiting sliding on two ends of the locking base. Wherein, one end portion of the passive rod is fixed on the braking ring 15c, the other defines a groove 33c. Two pivoting members 5c are rotatably attached to two ends of the locking base. Two circular pillars are formed at two ends of the pivoting member, one of the pillar 53c is arranged inside the groove 33c of the passive rod, and the other pillar 56c is arranged inside the groove 66c of a one-sided transmission rod 6c of the pedal crank. Under operation of the transmission rod 6c, driving the pivoting member 5c rotate, then rotation of the pivoting member 5c makes the braking ring 15c fixed on the passive rod 4c operate, the braking ring drives the two locking rack 13c pivotally engaged thereof, making the two locking racks drive two gear 12c (one foldable pedal with one gear) fixed on the two foldable pedals, and causing the two foldable pedals respectively rotate certain angle degrees in a one-sided reverse direction relative to the pedal base so as to achieve a functional purpose. In the present embodiment, embodiment 1 can be referred, one end portion of the locking rack is fixed with the braking ring, one end portion of the passive rod defines a groove to receive the braking ring, bearing balls for reducing friction force are provided inside the groove, thereby setting up a rotating connection between the locking rack and the passive rod.

In order to build a synchronous folding in one operation of the foldable pedals respectively arranged on both sides of the bicycle axle in the embodiment 3, central controlling assembly disclosed in the embodiment 1 or 2 can be used. Together with the transmission subassembly, the embodiment 3 can attain synchronous working purpose.

Embodiment 4

Figure 14:
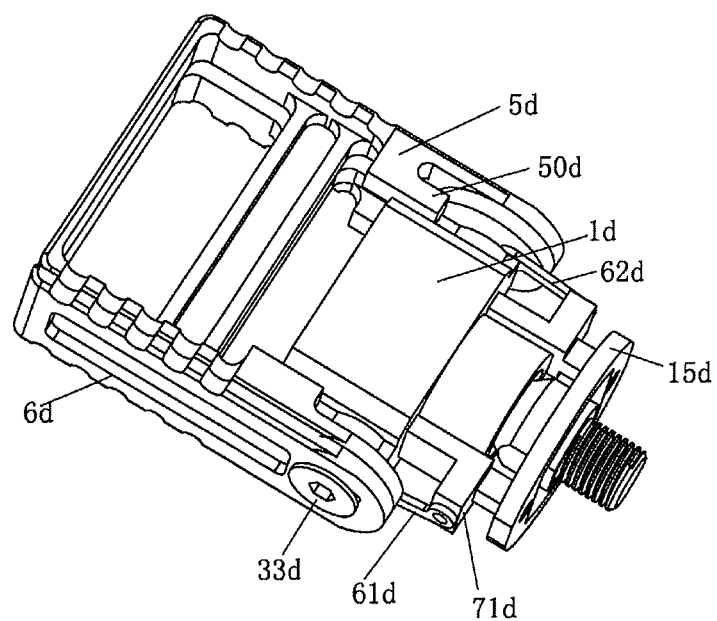
FIG. 14 is a perspective view according to a fourth embodiment of the present application.
Figure 15:
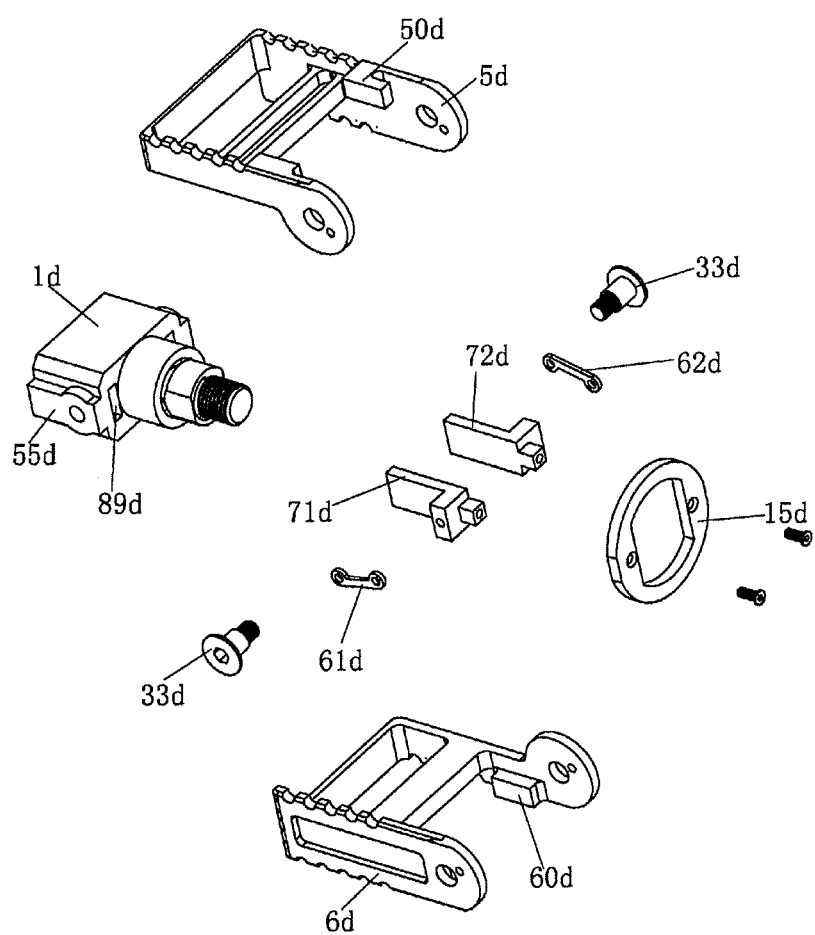
FIG. 15 is an exploded view according to the fourth embodiment of the present application.
Figure 16:
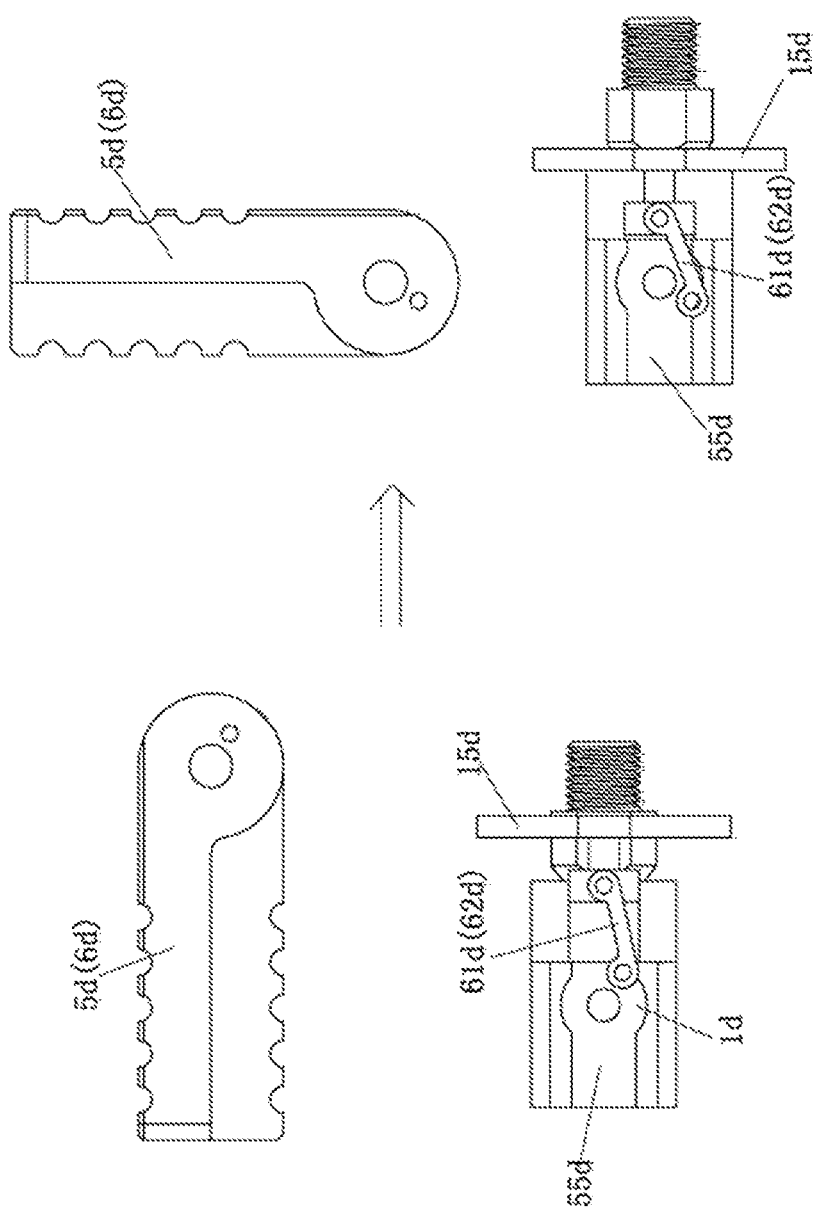
FIG. 16 is a schematic view showing folding process of pedals according to the fourth embodiment of the present application.

Referring to FIGS. 14 to 16, pedal panel 5$d$ and pedal panel 6$d$ are respectively connected by the pivot spindles 33$d$ pivotally with the pedal base 1$d$. Moreover, two restricting inner protrusion 50$d$ are arranged inboard the pedal panel 5$d$ thereof, and two restricting inner protrusion 50$d$ are also arranged inboard the pedal panel 6$d$. When the two pedal panels are free of being folded, the restricting portion 55$d$ of the pedal base 1$d$ is arranged between inner brims of the two pedal panels, so that, rotation of the two pedal panels in folding pedal direction are restricted.

In addition, the locking member 71$d$ is rotatably attached to the pedal panel 5$d$ by the connecting rod 61$d$, and the locking member 72$d$ is rotatably attached to the pedal panel 6$d$ by the connecting rod 62$d$. The two locking members are fixed with one braking ring 15$d$, thereby the two locking members can have simultaneous locomotion. The connecting rod 61$d$ and the connecting rod 62$d$ are indirectly and pivotally attached to the braking ring 15$d$ by the locking member 71$d$ and the locking member 72$d$. The pedal panel 5$d$ and the pedal panel 6$d$ having coaxial pivotal connection, the connecting rod 61$d$ in pivotal connection with the pedal panel 5$d$, and the connecting rod 62$d$ in pivotal connection with the pedal panel 6$d$ form a four-bar linkage mechanism together. Wherein, slots 89$d$ is defined in the pedal base 1$d$ for restricted sliding of the locking member 71$d$ and locking member 72$d$, thereby making the sliding trace of the two locking members and the braking ring 15$d$ fixed therewith parallel to the central spindle axis.

Therefore, by driving the braking ring 15$d$, making the connecting rod 61$d$ in indirect pivotal connection with the braking ring 15$d$ push the pedal panel 5$d$ to be folded or to be reinstating reciprocated, and making the connecting rod 62$d$ push the pedal panel 6$d$ to be folded or to be reinstating reciprocated, thereby fulfilling folding pedals.

The first end portion of the connecting rod 61$d$ is in pivotal connection with the locking member 71$d$, and the second end portion of the connecting rod 61$d$ is in pivotal connection with pedal panel 5$d$. The first end portion of the connecting rod 62$d$ is in pivotal connection with the locking member 72$d$, and the second end portion of the connecting rod 62$d$ is in pivotal connection with the pedal panel 6$d$. Due to the same fixation with the braking ring 15$d$ of the locking member 5$d$ and the locking member 6$d$, when the braking ring is moved, the connecting rod 61$d$ drives the pedal panel 5$d$ reciprocatingly rotate along the pivot spindle 33$d$, fulfilling the folding process and reinstating reciprocation process between the pedal panel and the pedal base. The connecting rod 62$d$ drives the pedal panel 6$d$ reciprocatingly turning around the pivot spindle 33$d$, fulfilling the folding process and reinstating reciprocation process between the foldable pedal and the pedal base, besides, the foldable pedal 5$d$ and the foldable pedal 6$d$ are turned in a reverse direction.

Embodiment 5

Figure 17:
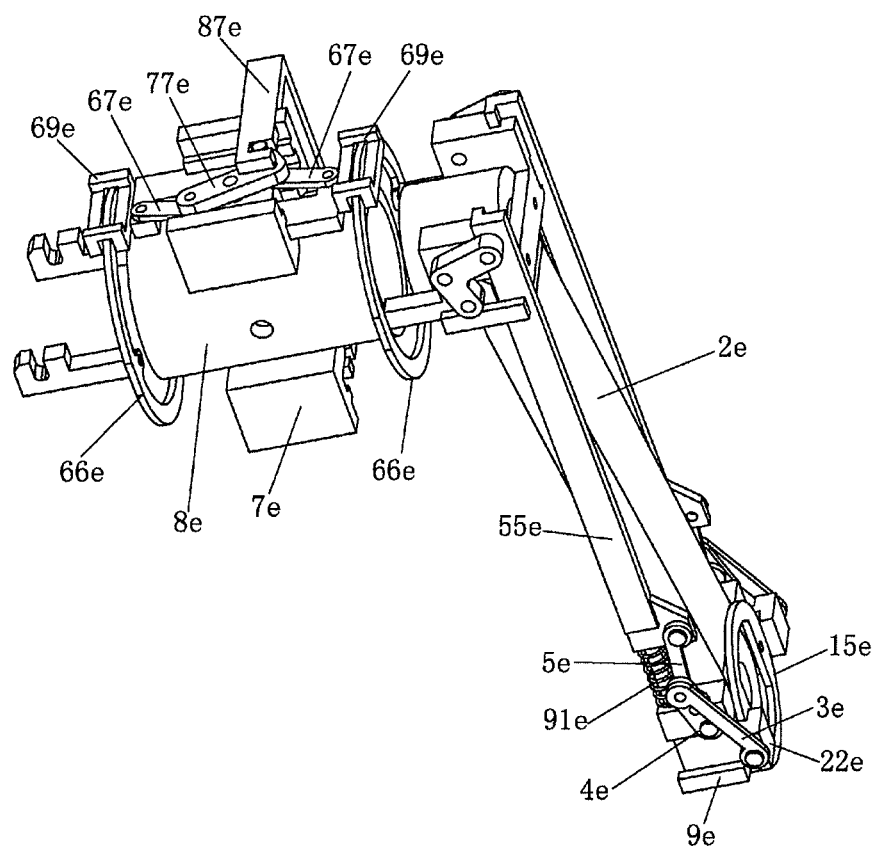
FIG. 17 is a perspective view of central controlling assembly according to a fifth embodiment of the present application.
Figure 18:
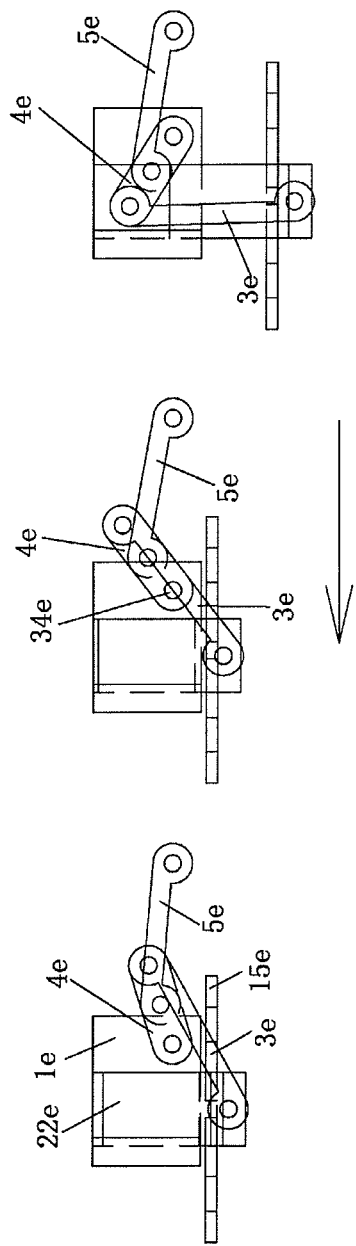
FIG. 18 is a schematic view showing working process of a braking ring and a connecting rod according to the fifth embodiment of the present application.
Figure 19:
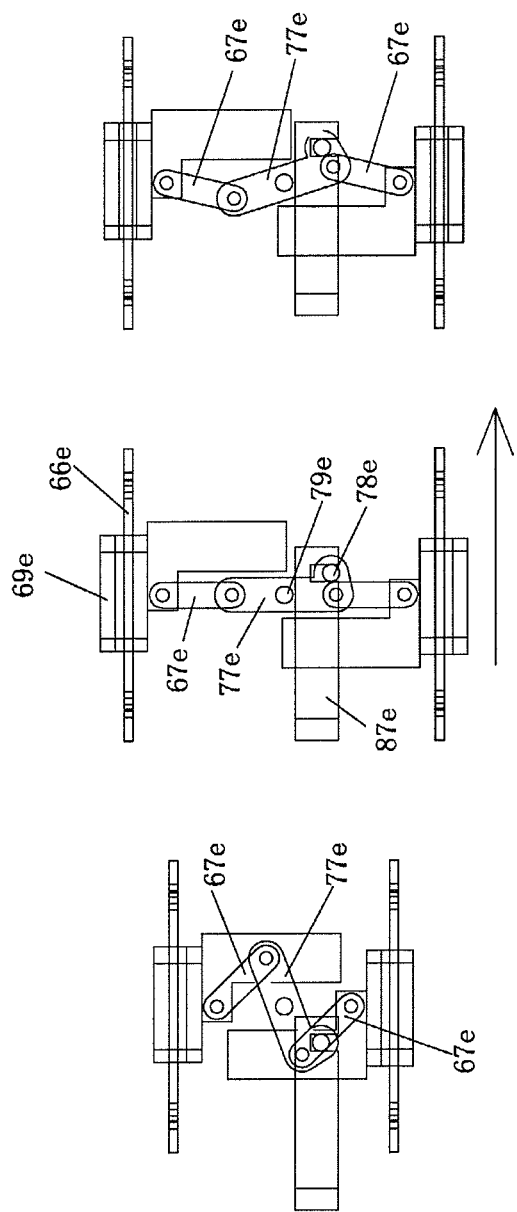
FIG. 19 is a schematic view showing working process of a receiving ring and a connecting rod according to the fifth embodiment of the present application.

Referring to FIG. 17 to FIG. 19, a locking base 9$e$ is provided at the joint portion between the pedal crank 2$e$ and the foldable pedal, sliding blocks 22$e$ are received in the locking base 9$e$, and a groove is defined in an end portion of the sliding block for accommodating the braking ring 15$e$, size of the groove receiving braking ring 15$e$ is bigger than thick of the braking ring, and no bearing ball is provided inside the groove. Wherein, sliding trance of the sliding block 22$e$ parallels with the central spindle axis of the pedal.

One end of the connecting rod 4$e$ is in pivotal connection with the locking base 9$e$, the other end of the connecting rod 4$e$ is in pivotal connection with the connecting rod 3$e$, and the rest end of the connecting rod 3$e$ is in pivotal connection with the sliding block 22$e$. In addition, one end of the connecting rod 5$e$ is in pivotal connection with the connecting rod 4$e$ at the middle thereof, and the other end of the connecting rod 5$e$ is in pivotal connection with the transmission rod 55$e$. At the same time, a retaining spring 91$e$ is provided between the transmission rod 55$e$ and locking base 9$e$, configured to keep the transmission rod 55$e$ in place when no braking operation occurs.

A relay controlling base 7$e$ is fixed on the bicycle axle 8$e$, a pushing piece 69$e$ is provided on the relay controlling base restrictedly sliding along the bicycle axle direction. Wherein, a groove is defined in the pushing piece 69$e$ for accommodating the receiving ring 66$e$, and the size of the groove accommodating the receiving ring 66$e$ is bigger than the thick of the receiving ring. in addition, middle portion of the connecting rod 77$e$ is in pivotal connection with the relay controlling base 7$e$, and the two ends of the connecting rod 77$e$ are respectively in pivotal connection with one end portion of the two connecting rods 67$e$, the other end portion of the two connecting rods 67$e$ are respectively attached to the pushing pieces 69$e$. The two pushing piece 69$e$ respectively push the receiving ring 66$e$s. In addition, a convex axle is formed on the connecting rod 77$e$, and the convex axle is arranged inside the groove of the locking member 87$e$.

Referring to FIG. 18, when reciprocating the braking ring, the transmission rod 55$e$ drives the connecting rod 5$e$ in pivotal connection with the transmission rod 55$e$, making the connecting rod 5$e$ bring the connecting rod 4$e$ of the locking base 9$e$ revolving, then the connecting rod 4$e$ driving the connecting rod 3$e$, successively driving the sliding block 22$e$ rotatably attached to connecting rod 3$e$, thereby the causing the sliding block 22$e$ fulfill reciprocating the braking ring 15$e$. During the reciprocating process, the groove of the sliding block 22$e$ contacts the braking ring 15$e$. When the connecting rod 4$e$ is turned to parallel with the connecting rod 3$e$ driven by the force of the connecting rod 5$e$, (i.e., pivoting points on two sides of the connecting rod 3$e$ is in linear arrangement with the pivoting points 34$e$ where the connecting rod 4$e$ pivotally attached to the locking base 9$e$), reinstating reciprocating of the braking ring 15$e$ is fulfilled, at this time, the braking ring no long moving. When the transmission rod continues to drive the connecting rod, the sliding block 22$e$ moves in a reverse direction, making the sliding block disengage with the braking ring 15$e$. Referring to the retaining spring 91$e$ shown in FIG. 17, is configured to make the sliding block 22$e$ in indirect pivotal connection with the transmission rod keep out of contact with the braking ring 15$e$, thereby fulfilling a revolving connection without friction between the sliding block 22$e$ and braking ring 15$e$ when the pedal folding operation is not occur.

Referring to FIG. 19, the convex axle 78$e$ of the connecting rod 77$e$ is received in the groove of the locking member 87$e$. When the locking member 87$e$ moves to a braking direction, causing the connecting rod 77$e$ rotate, make the connecting rod 67$e$ pivotally engaged therewith drive the pushing piece 69$e$ in pivotal connection with the connecting rod move, and bring the receiving ring shift some distance and transmit the power to the lower course transmission parts. When the connecting rod 67e is paralleled with the connecting rod 77e, (i.e., two pivoting points of the connecting rod 67e and the connecting rod 77e is in linear engagement with the pivoting point 79e between the connecting rod 77e and the relay controlling base) the receiving ring 66e is no long moving. When continue moving in the original direction, the locking member 87e drives the connecting rod 77e, the pushing piece 69e is indirectly driven by the connecting rod 77e with assistance of the connecting rod 67e, making the pushing piece 69e shift some distance in a reverse direction relative the original one. Therefore, the pushing piece get out of contact with the receiving ring, at the same time, the receiving ring is indirectly connected with the transmission rod 55e. The transmission rod 55e is hold in place relying on the retaining spring 91e, therefore a connection without contact and friction between the receiving ring 66e and the pushing piece 69e is formed.

While the present patent application has been shown and described with particular references to a number of embodiments thereof, it should be noted that various other changes or modifications may be made without departing from the scope of the present invention.

What is claimed is:

1. A bicycle pedal folding assembly comprising:
    a foldable pedal;
    a pedal base rotatingly attached to a bicycle pedal crank, the foldable pedal pivotally coupled with the pedal base;
    a braking ring located around a junction where the pedal base is rotatingly attached to the bicycle pedal crank;
    a folding transmission subassembly;
    a locking base mounted on a lower end portion of the pedal crank; and
    a driving subassembly located on the locking base, wherein the driving subassembly is configured to connect the folding transmission subassembly to the braking ring,
    wherein the pedal base defines a first axial line, the foldable pedal defines a second axial line, and the foldable pedal has a working position and a folded position along a rotating path, the braking ring is configured to reciprocate along the first axial line, the braking ring, which is driven by the driving subassembly, is configured to fold the foldable pedal from the working position to the folded position by the transmission subassembly shifting from a working position to a folded position, and
    wherein the folded position of the foldable pedal is substantially perpendicular to the working position of the foldable pedal.

2. The bicycle pedal folding assembly of claim 1, wherein the foldable pedal comprises two pedal panels, the two pedal panels are both rotatable around the second axial line, the folding transmission subassembly comprises two connecting rods, one end of respective connecting rod is pivotally connected with the braking ring, the other end of respective connecting rod is pivotally connected with corresponding pedal panel, and wherein the two pedal panels rotate in opposite directions.

3. The bicycle pedal folding assembly of claim 2, wherein the pedal base comprises two restricting portions configured to prevent the two pedal panel rotating in reverse, and both the pedal panels comprise restricting inner protrusion in correspondence with the restricting portion.

4. The bicycle pedal folding assembly of claim 1, wherein the folding transmission subassembly is gear-rack mechanism, gear of the gear-rack mechanism is fixed on the foldable pedal, rack of the gear-rack mechanism is driven by the braking ring.

5. The bicycle pedal folding assembly of claim 4, further comprising a locking subassembly, the locking subassembly comprising a first locking member driven by the braking ring and a second locking member formed on the foldable pedal, in the course of reciprocating of the braking ring, the first locking member defines a locking point relative to the second locking member and a detaching point released from the second locking member, wherein the first locking member is a locking block fixed on the braking ring, the second locking member is a concave portion defined in the foldable pedal.

6. The bicycle pedal folding assembly of claim 1, further comprising a locking subassembly, the locking subassembly comprising a first locking member driven by the braking ring and a second locking member formed on the foldable pedal, in the course of reciprocating of the braking ring, the first locking member defines a locking point relative to the second locking member and a detaching point released from the second locking member, wherein the locking subassembly comprises pivoting member, the first locking member is a fixing bar, the second locking member is a slot defined in the foldable pedal, the pivoting member comprises a middle portion, and a first end portion and a second end portion besides the middle portion, the middle portion of the pivoting member is pivotally connected to the pedal base, the first end portion is driven by the braking ring, the second end portion is arranged within the slot of the fixing bar.

7. The bicycle pedal folding assembly of claim 1, wherein the bicycle pedal crank is configured to engage a central locking subassembly arranged on a bicycle axle, the central locking subassembly synchronously drives two receiving rings along respective first axial lines, the two receiving rings are respectively configured to drive the braking ring of the bicycle pedal folding assembly and a second braking ring of a second bicycle pedal folding assembly along respective first axial lines.

8. The bicycle pedal folding assembly of claim 1, wherein the driving subassembly is slidingly engaged with the locking base, and wherein the transmission subassembly is configured to be actuated by a user between the working position and the folded position, such that the transmission subassembly is configured to actuate the braking ring via the driving subassembly in order to drive the foldable pedal between the working position and the folded position.

9. A controlling device for synchronous folding pedals for bicycle, comprising:
    cranks on two sides of a bicycle;
    a bicycle axle;
    a central locking subassembly
    two receiving rings; and
    two bicycle pedal folding assemblies, each comprising:
        a foldable pedal;
        a pedal base rotatingly attached to a bicycle pedal crank, the foldable pedal pivotally coupled with the pedal base;
        a braking ring is located around a junction where the pedal base is rotatingly attached to the bicycle pedal crank;
        a folding transmission subassembly;
        a locking base mounted on a lower end portion of the pedal crank; and
        a driving subassembly located on the locking base, wherein the driving subassembly is configured to connect the folding transmission subassembly to the braking ring,
        wherein the pedal base defines a first axial line, the foldable pedal defines a second axial line, and the foldable pedal has a working position and a folded position along a rotating path, the braking ring is configured to reciprocate along the first axial line, the braking ring, which is driven by the driving subassembly, is configured to fold the foldable pedal from the working position to the folded position by the transmission subassembly shifting from a working position to a folded position;

wherein the two pedal cranks are pivotally connected with respective pedal base of the bicycle pedal folding assemblies, the central locking subassembly is arranged on the bicycle axle, the central locking subassembly synchronously drives the two receiving rings move along the first axial line, the two receiving rings respectively drive the two braking rings of the bicycle pedal folding assemblies move along the first axial line; and wherein the folded position of the foldable pedal is substantially perpendicular to the working position of the foldable pedal.

10. The controlling device for synchronous folding pedals for bicycle of claim 9, wherein the receiving ring drives the braking ring by transmission subassembly, the transmission subassembly comprises a first transmission apparatus configured to change a first direction movement to a second direction movement deviating from the first direction movement; wherein the driving subassembly is configured to change the second direction movement to the first direction movement, the first direction refers to direction of the first axial line.

11. The controlling device for synchronous folding pedals for bicycle of claim 10, wherein the first transmission apparatus and the driving subassembly are both gear-rack mechanism.

12. The controlling device for synchronous folding pedals for bicycle of claim 10, wherein the transmission subassembly comprises a transmission base, the transmission base is mounted on upper end portion of the pedal crank, wherein the first transmission apparatus comprises a first transmission rod and a first pivoting member, the driving subassembly comprises a second transmission rod, a second pivoting member, and a passive rod, middle portion of the first pivoting member is rotatably connected with the transmission base, middle portion of a second pivoting member is rotatably attached to the locking base, one end portion of the first pivoting member is arranged within a groove of the first transmission rod, and the other end portion of the first pivoting member is arranged within a groove of the second transmission rod; one end portion of the second pivoting member is arranged within a groove at the bottom of the second transmission rod, the other end portion of the second pivoting member is arranged within a groove in the passive rod, the receiving ring drives the first transmission rod, the first transmission rod drives the second transmission rod by the first pivoting member, the second transmission rod drives the passive rode by the second pivoting member, and the passive rode drives the braking ring.

13. The controlling device for synchronous folding pedals for bicycle of claim 10, wherein the transmission subassembly comprises a transmission base and a locking base, the transmission base and the locking base are respectively mounted on upper end portion and lower end portion of the pedal crank, wherein driving subassembly comprises a first connecting rod and two second connecting rods, one end portion of the first connecting rod is pivotally attached to the locking base, the other end portion of the first connecting rod is pivotally connected with respective end portions of the two second connecting rods, the other end portion of the two second connecting rods are respectively connected with outputs of the braking ring and the first transmission apparatus, the plane defined by the first connecting rod is parallel with the plane defined by the second connecting rod.

14. The controlling device for synchronous folding pedals for bicycle of claim 9, wherein the central locking subassembly comprises main locking member and locking transmission subassembly, the main locking member drives the two receiving rings by the locking transmission subassembly.

15. The controlling device for synchronous folding pedals for bicycle of claim 14, further comprising a seat tube and a third pivoting member, the seat tube comprises a first part and a second part pivotally assembled by a shaft, the third pivoting member is coaxial with the shaft, on end portion of the third pivoting member is fixed on the first part, the other end of the third pivoting member is arranged within a groove of the main locking member, thereby transmitting the braking force form the seat tube to the main locking member.

16. The controlling device for synchronous folding pedals for bicycle of claim 14, wherein the locking transmission subassembly is a gear-rack mechanism, the gear of the gear-rack mechanism is rotatably mounted on a relay controlling base fixed on the bicycle axle, the rack of the gear-rack mechanism drives the receiving ring.

17. The controlling device for synchronous folding pedals for bicycle of claim 14, wherein the locking transmission subassembly is a connecting rod mechanism, wherein the connecting rod mechanism comprises a fourth connecting rod, two fifth connecting rods, wherein the fourth connecting rod is rotatably attached to a relay controlling base fixed on the bicycle axle, two end portions of the fourth connecting rod are rotatably mounted on one end portion of the two fifth connecting rods respectively, the other end portions of the two fifth connecting rods respectively drive the receiving rings, and planes where the fourth connecting rod, the fifth connecting rod and the sixth connecting rod respectively lies are paralleling, wherein the other end portions of the two fifth connecting rods are both pivotally connected with the pushing piece, the pushing piece defines a groove, the receiving ring is accommodated in the groove.

18. A bicycle comprising a controlling device for synchronous folding pedals, the controlling device comprising:
cranks on two sides of the bicycle;
a bicycle axle;
a central locking subassembly
two receiving rings; and
two bicycle pedal folding assemblies, each comprising:
a foldable pedal;
a pedal base rotatingly attached to a bicycle pedal crank, the foldable pedal pivotally coupled with the pedal base;
a braking ring is located around a junction where the pedal base is rotatingly attached to the bicycle pedal crank;
a folding transmission subassembly;
a locking base mounted on a lower end portion of the pedal crank; and
a driving subassembly located on the locking base, wherein the driving subassembly is configured to connect the folding transmission subassembly to the braking ring,
wherein the pedal base defines a first axial line, the foldable pedal defines a second axial line, and the foldable pedal has a working position and a folded position along a rotating path, the braking ring is configured to reciprocate along the first axial line, the braking ring, which is driven by the driving subassembly, is configured to fold the foldable pedal from the working position to the folded position by the transmission subassembly shifting from a working position to a folded position;
wherein the two pedal cranks are pivotally connected with respective pedal base of the bicycle pedal folding assemblies, the central locking subassembly is arranged on the bicycle axle, the central locking subassembly synchronously drives the two receiving rings move along the first axial line, the two receiving rings respectively drive the two braking rings of the bicycle pedal folding assemblies move along the first axial line; and wherein the folded position of the foldable pedal is substantially perpendicular to the working position of the foldable pedal.

\* \* \* \* \*